Figure 1:
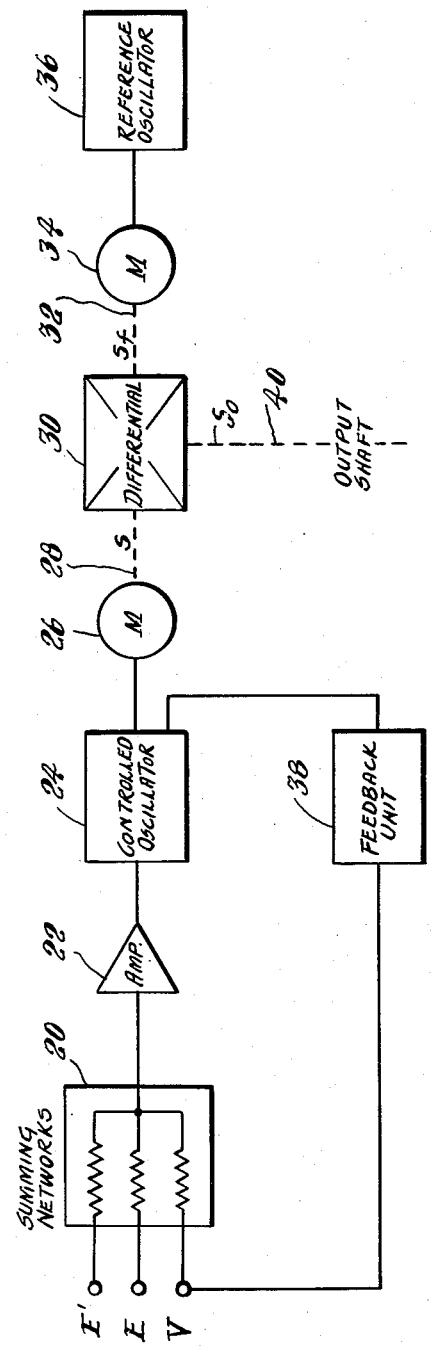

Jan. 3, 1961 J. TURTORA 2,967,019
FREQUENCY CONTROLLED INTEGRATOR
Filed April 16, 1958 3 Sheets-Sheet 1

INVENTOR.
JOHN TURTORA
BY
Lawrence S. Epstein
ATTORNEYS

INVENTOR.
JOHN TURTORA

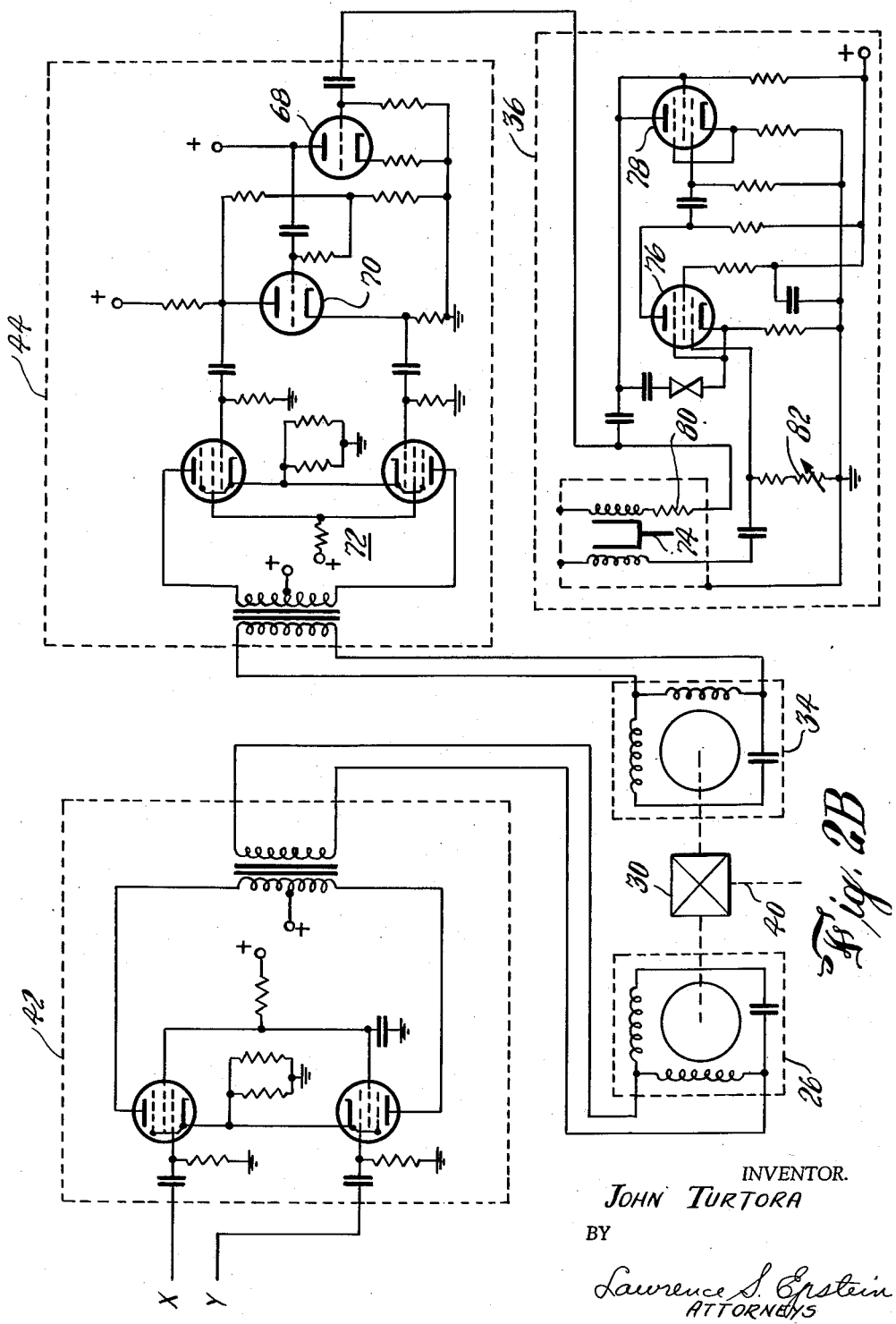

United States Patent Office 2,967,019
Patented Jan. 3, 1961

2,967,019

FREQUENCY CONTROLLED INTEGRATOR

John Turtora, Fairfax, Va., assignor, by mesne assignments, to the United States of America as represented by the Secretary of the Navy Filed Apr. 16, 1958, Ser. No. 729,044

10 Claims. (Cl. 235—183)

This invention relates to integrating devices and especially to electro-mechanical, frequency-controlled integrators.

It is frequently desirable to obtain an output which is proportional to the integral of a given input. For example, integrating devices may be employed as components of computers and target course generators. Some of the existing devices which perform integration include electronic circuits employing Miller integrators and velocity servomechanisms.

These existing devices possess several disadvantages. For example, if performed for an extended period, electronic integration may be inaccurate because of zero-drift in the amplifiers. Velocity servomechanisms utilize expensive components and their accuracy is limited by the accuracy of the integrating component. The integrating component generally employed is a tachometer, which has a limited dynamic range and is often temperature dependent.

The components employed in the present device are relatively inexpensive and non-critical. For example, the synchronous motors may be inexpensive clock motors of the hysteresis type with sufficient torque to drive potentiometers and indicating devices. Also, the zero-setting can be precisely accomplished thereby extending the dynamic range of the device in comparison to servo-mechanism devices where the tachometers provide a residual voltage output even at zero speed.

The objects and advantages of the present invention are accomplished by converting the signal to be integrated into a signal having a frequency which is proportional to the magnitude of the input signal, utilizing this frequency to obtain a proportionate speed of rotation, comparing this speed of rotation with a fixed or reference speed of rotation and utilizing the difference to provide an output speed of rotation which is the integral with respect to time of the amplitude of the input signal.

In a typical embodiment of the invention, the integrated output is provided by the output shaft of a mechanical differential, each input shaft being connected to a different synchronous motor. One synchronous motor is fed by a fixed-frequency reference oscillator. The other synchronous motor is fed by another oscillator the frequency of which is controlled in accordance with the amplitude of the signal to be integrated. The latter is impressed upon the controlled oscillator through a summing network and an amplifier.

A second signal is fed into the summing network, the amplitude of this signal being sufficient to rotate the synchronous motor associated with the controlled oscillator at a speed equal to that of the reference synchronous motor so that, when the signal to be integrated is at zero amplitude, both synchronous motors rotate at the same speed and the differential output is zero.

Feedback may be employed, if necessary, to stabilize the controlled oscillator. If this is desired, a frequency discriminator may be fed from the output of the controlled oscillator and the discriminator output may be applied directly to the input of the controlled oscillator or may be brought in as a third input to the summing network. An object of this invention is to integrate an input signal.

Another object is to accurately integrate an input signal by electro-mechanical means.

A further object is to provide an accurate electro-mechanical integrator which utilizes relatively inexpensive components and reduces the zero-drift which characterizes many electronic computers.

Figure 2A:
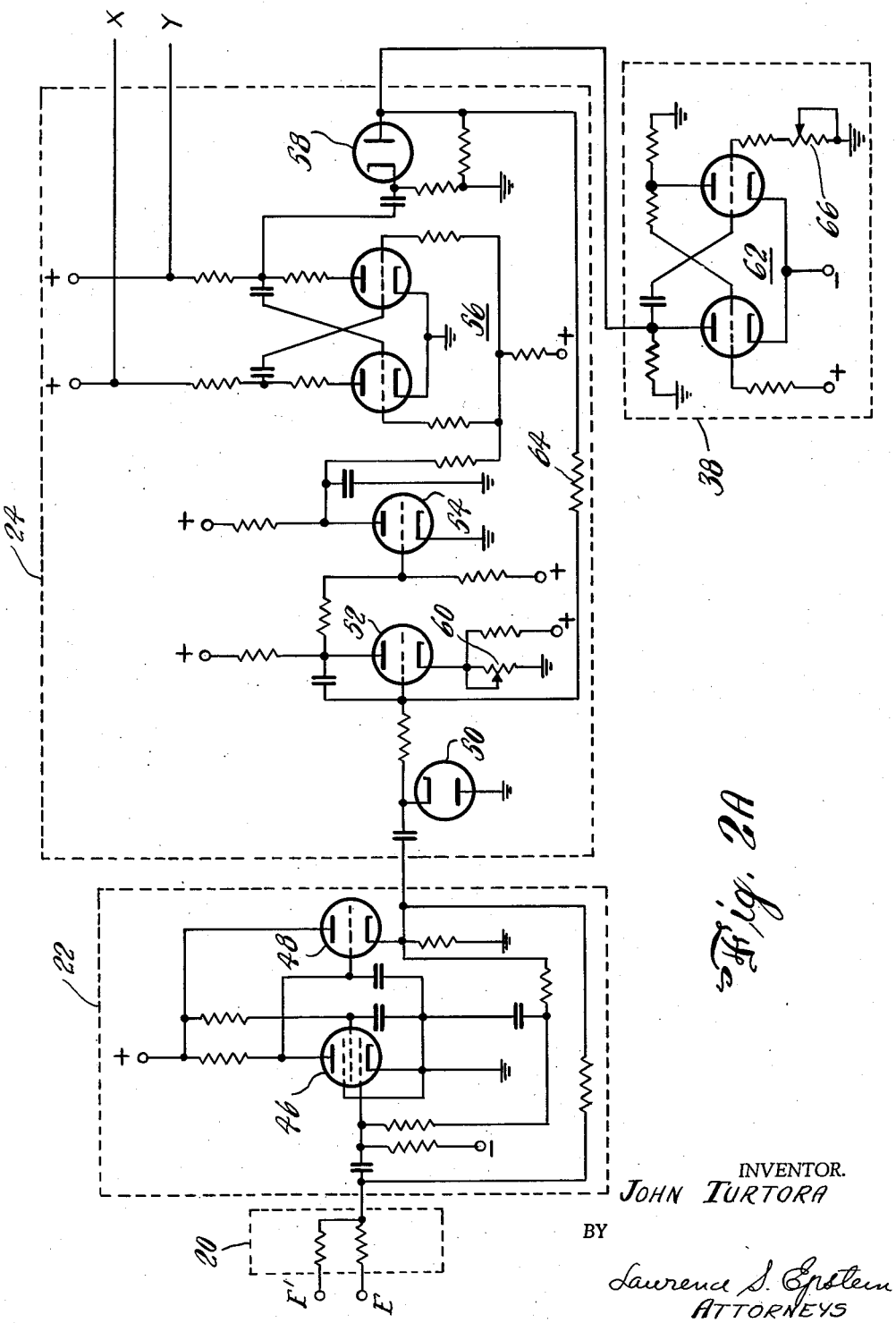

Other objects and many of the attendant advantages of this invention will be readily appreciated as the same becomes better understood by reference to the following detailed description when considered in connection with the accompanying drawings wherein:

Figure 1 is a simplified block diagram of a preferred embodiment of the invention; and Figure 2, shown as Fig. 2A and 2B, is a schematic circuit diagram showing the details of a slightly altered version of the embodiment shown in Figure 1.

In Figure 1, three signals are applied to a summing network 20. The three signals are: E, a voltage to be integrated; E', a zero-set voltage; and V, a feedback voltage. The summing network 20 may consist merely of three resistors connected together at one end, as shown.

The output of the summing network 20 is connected thru an amplifier 22 to a controlled oscillator 24. This may preferably comprise a conventional multivibrator. The frequency of oscillation is determined by the magnitude of its input voltage.

The oscillator output is fed to a synchronous motor 26, the speed of rotation (S) of this controlled-oscillator motor 26 being determined by the frequency (actually the pulse repetition frequency or PRF) of the oscillator 24. Any suitable synchronous motor may be employed such as a hysteresis-type clock motor, for example. The shaft 28 of the controlled-oscillator motor 26 is coupled to one of the input gears of a mechanical differential 30.

The other input gear of the differential 30 is rotated at a fixed speed ($S_f$) by the shaft 32 of the reference-oscillator motor 34. The input to this synchronous motor 34 is obtained from a reference oscillator 36 which may be any suitable oscillator providing a stable output frequency. In the preferred embodiment, a conventional tuning-fork-type oscillator is employed. Of course, it should be noted that amplifiers may be, and are, utilized wherever necessary or desired, although not specifically illustrated in the simplified block diagram. For example, amplifiers may be used at the output of the reference oscillator 36, at the output of the controlled oscillator 24 and at the output of the feedback unit 38.

The feedback unit 38 is employed to provide a negative feedback voltage from the output to the input circuit of the controlled oscillator. The feedback unit 38 may be any suitable unit capable of providing the right type of feedback signal for the particular type of oscillator 24 employed. Thus, for the multivibrator utilized here, a one-shot multivibrator operating as a frequency discriminator is employed.

The output shaft 40 of the mechanical differential 30 rotates at a speed ($S_0$) determined by the difference between the speeds of rotation of the controlled-oscillator motor 26 and the reference-oscillator motor 34.

In operation before the voltage to be integrated (E) is connected, the zero set signal (E') is applied and adjusted to such a magnitude that the frequency of the output of the controlled oscillator 24 is exactly equal to the frequency of the output of the reference oscillator 36, so that the two synchronous motors 26 and 34 rotate at exactly the same speed. The speed of rotation of the output shaft 40 of the mechanical differential 30 is, therefore, zero. The signal employed in this embodiment as a zero-set signal (E') is derived from a 1000 cycle sine wave of adjustable amplitude. The positive voltage to be integrated (E) is now applied and results in a higher frequency of oscillation of the controlled oscillator 24, a more rapid speed of rotation of the motor 26 and rotation of the output shaft of the differential 30 at a speed ($S_0$) equal to the difference ($S-S_f$) between the shaft speeds of the controlled-oscillator motor 26 and the reference-oscillator motor 34.

Figure 2 shows some circuits which may be employed in the blocks of Figure 1. Since the circuits are conventional, no attempt will be made to describe them in detail.

In the embodiment shown in Figure 2, only two input signals (E and E') are impressed upon the amplifier section 22. This section includes an amplifier stage 46 and a cathode follower stage 48 with a feedback loop from the cathode follower output to the amplifier input.

The controlled oscillator section 24 includes a diode stage 50, two triode amplifier stages 52 and 54, a multivibrator stage 56 and a coupling diode stage 58. The output of the amplifier block 22 is applied to the cathode of the diode 50 which rectifies the signal by passing the negative portion to ground. The rectified signal is amplified by stages 52 and 54. The potentiometer 60 in the cathode circuit of stage 52 is employed to set the bias of the stage at a given positive voltage, thus setting the level of the D.C. signal at the plate, which in turn controls the pulse repetition frequency (PRF) of the multivibrator (a free-running type).

The PRF of the multivibrator stage 56 can be altered by changing the D.C. bias on its control grids. Thus, the PRF is a function of the amplitude of the input signal to the multivibrator.

To stabilize the PRF of the multivibrator, a negative feedback voltage is provided by a one-shot multivibrator 62, which is triggered through coupling diode 58 by the leading edge of the negative pulse at the plate of the right-hand section of the multivibrator 56. The negative pulse output from the plate of the left hand section of the one-shot multivibrator is applied thru isolating resistor 64 to the control grid of the amplifying stage 52. Because this feedback voltage is of opposite polarity to the input from the amplifier section 24, it will tend to oppose any increase in the PRF of the free-running multivibrator. As the PRF increases, the average negative voltage from the plate of the left-hand section of the one-shot multivibrator stage 62 increases due to the higher pulse repetition rate. The average negative voltage fed back to stage 52 can be adjusted by means of rheostat 66 which controls the pulse width of the one-shot multivibrator.

It should be noted that the feedback from the one-shot multivibrator stage 62 is not applied to the summing network 20 as shown in the simplified block diagram, Figure 1, but rather to a later amplifier stage 52. Either method may be employed, or the feedback may be applied directly to the grids of the controlled-oscillator multivibrator stage 56. No matter where the connection is made, due consideration must be given to signal polarity, so that the feedback signal at the control grids of the free-running multivibrator stage 56 is opposite in polarity to the signal to be integrated.

The two-phase output of the multivibrator stage 56 is applied to a conventional push-pull power amplifier stage 42 which drives the synchronous motor 26. This amplifier stage is not present in the simplified block diagram of Figure 1.

The other synchronous motor 34 is driven by an amplifier stage 44 which includes a triode amplifier stage 68, a paraphrase amplifier stage 70 and another push-pull amplifier stage 72. This amplifier stage, too, is not present in the simplified block diagram of Figure 1.

The reference oscillator unit 36 employs a tuning-fork-type oscillator. The tuning fork 74 is of bi-metallic construction, making a close approach to a zero temperature coefficient possible. The tuning fork assembly is housed in a hermetically sealed and partially evacuated housing, providing immunization to barometric and temperature changes.

The tuning fork drive and pick-up system is electromagnetic. The output is amplified by a pair of pentodes 76 and 78. The high output impedance of the pentode input tube 76 combined with negative feedback through a voltage-sensitive resistor 80 maintains the tuning fork amplitude and frequency constant, regardless of supply voltage variations and tube aging.

The frequency standard unit 36 is calibrated to within one part in a million of the operating frequency and the calibration will normally remain to within 10 parts in a million. However, if necessary, the frequency of the unit may be readjusted by varying the variable resistor 82 connected between the control grid of pentode 76 and ground.

Of course, alternate circuits may be employed in place of the ones shown in Figure 2. For example, if the inputs are D.C., the amplifier shown in block 22 may be either an A.C. amplifier with a chopper at the input and output to chop the input D.C. voltage and then re-rectify it, or a straight D.C. amplifier. The frequency discriminator used in the feedback unit 38, the one-shot multivibrator, may be eliminated in favor of a passive network, such as a differentiating circuit which develops a spike of constant energy per cycle.

The differential may be replaced by a device such as a resolver with two rotor and two stator phases. If a two-phase voltage of one frequency is applied to the rotor, and a two-phase voltage of another frequency is applied to the stator, then the shaft will turn at a rate proportional to the difference in frequency. This device could also be a two-phase wound-rotor induction motor, similar to three-phase types now in use, in which the reference frequency is connected to the stator and the controlled frequency is fed to the wound rotor.

The mathematics describing the functioning of the simplified device shown in Figure 1 is as follows:

$$E'+E+V=e$$

where $e$ is the input voltage to the amplifier.

$$-V=E'+E-e$$

where $V$ is proportional to oscillator frequency which in turn is proportional to motor speed.

Therefore:

$$K_1S=E'+E-e$$

where $S$ is the synchronous motor speed. The output shaft of the differential is proportional to the difference in speed between the two synchronous motors.

$$S_0=K_2(S-S_f)$$

where $S_0$ is the differential output shaft speed, $K_2$ is a constant of proportionality, and $S_f$ is a reference speed controlled by the reference oscillator. Substituting, $$S_0=K_2\left[\frac{E'+E-e}{K_1}-S_f\right]$$

$$=\frac{K_2}{K_1}E-\frac{K_2}{K_1}e+\frac{K_2}{K_1}E'-K_2S_f$$

E' is adjusted so that when $E=0$, $S_0=0$ and therefore, $$K_2S_f=\frac{K_2}{K_1}e-\frac{K_2}{K_1}E'$$

and therefore, $$S_0=\frac{K_2}{K_1}E$$

Since $$\int_0^t S_0 dt = \theta$$

where $\theta$ is the angle thru which the output shaft turns, then substituting, we obtain, $$\theta = \frac{K_2}{K_1}\int_0^t E dt$$

The approximation involved in this expression is that the amplifier has a gain sufficiently high so that the change in $e$ is negligibly small as the frequency is controlled. Also, the frequency discriminator 38 must be linear.

Obviously many modifications and variations of the present invention are possible in the light of the above teachings. It is therefore to be understood that within the scope of the appended claims the invention may be practiced otherwise than as specifically described.

What I claim is:

1. A device for integrating a signal comprising, in combination: connections for a signal to be integrated; connected to receive as an input signal the combination of said signal to be integrated and said zero-set signal, said first oscillating means producing an output signal having a frequency controlled in accordance with a characteristic of its input signal; first motor means connected to receive the output of said first oscillating means as an input signal, the speed of rotation of said motor means being proportional to the frequency of the output signal of said first oscillating means; differential means having two input gears and an output gear shaft, said output gear shaft rotating at a speed which is the difference between the speeds of rotation of said two input gears, one said input gear being coupled for rotation by said first motor means; second motor means coupled to rotate the other said input gear of said differential means, said second motor means rotating at a speed proportional to the frequency of its input signal; and second oscillating means providing an input signal for said second motor means, said input signal being of fixed frequency and serving as a stable reference frequency against which the frequency of said first oscillating means is compared through the agency of the rotational speeds of said first two motor means, said zero-set signal being employed to initially set the frequency of said first oscillating means so that, when said signal to be integrated is absent, the two input gears of said differential rotate at identical speeds and the rate of rotation of the output gear is zero and, when said signal to be integrated is present, said output gear rotates at a speed proportional to the amplitude of said signal to be integrated, the total angle thru which said output gear travels being the integral with respect to time of said characteristic of said signal to be integrated.

2. A device for integrating a signal comprising, in combination: connections for a signal to be integrated; connections for a zero-set signal; first oscillating means connected to receive as an input signal the combination of said signal to be integrated and said zero-set signal, said first oscillating means producing an output signal having a frequency controlled in accordance with the amplitude of its input signal; first motor means connected to receive the output of said first oscillating means as an input signal, the speed of rotation of said motor means being proportional to the frequency of the output signal of said first oscillating means; differential means having two input gears and an output gear shaft, said output gear shaft rotating at a speed which is the difference between the speeds of rotation of said two input gears, one said input gear being coupled for rotation by said first motor means; second motor means coupled to rotate the other said input gear of said differential means, said second motor means rotating at a speed proportional to the frequency of its input signal; and second oscillating means providing an input signal for said second motor means, said input signal being of fixed frequency and serving as a stable reference, frequency against which the frequency of said first oscillating means is compared through the agency of the rotational speeds of said first two motor means, said zero-set signal being employed to initially set the frequency of said first oscillating means so that, when said signal to be integrated is absent, the two input gears of said differential rotate at identical speeds and the rate of rotation of the output gear is zero and, when said signal to be integrated is present, said output gear rotates at a speed proportional to the amplitude of said signal to be integrated, the total angle through which said output gear travels being the integral with respect to time of the amplitude of said signal to be integrated.

3. A device for integrating a signal comprising, in combination: connections for at least a pair of input signals, the first connection being for a signal to be integrated and the second being for a zero-set signal; means connected to said two connections for producing a combined output signal; controlled oscillator means connected to receive said combined output signal as an input for producing an output signal having a frequency which corresponds with a characteristic of the combined signal; controlled motor means of the synchronous motor type connected to receive the output of said oscillator means as an input, the speed of rotation of its output shaft being proportional to the frequency of its input; reference oscillator means adapted to produce a fixed-frequency output signal of high stability; reference motor means of the synchronous motor type connected to receive the output of said reference oscillator means as an input, the speed of rotation of its output shaft being proportional to the frequency of its input; and means coupled to the output shafts of said controlled motor means and said reference motor means for comparing the speed of rotation of the output shaft of said controlled motor means with that of the output shaft of said reference motor means and producing an output rotation, the speed of which is the difference between these speeds of rotation, the output rotation of said comparison means being zero when the speed of rotation of said controlled motor means equals the speed of rotation of said reference motor means, this condition being obtained by properly adjusting a characteristic of said zero-set signal in the absence of any signal to be integrated, the speed of the output rotation of the comparison means being proportional to said characteristic of the signal to be integrated so that the total angle of travel of the output rotation is the integral with respect to time of said characteristic of the signal to be integrated.

4. A device for integrating a signal comprising, in combination: connections for at least a pair of input signals, the first connection being for a signal to be integrated and the second being for a zero-set signal; means connected to said two connections for producing a combined output signal which constitutes the sum of the amplitudes of said input signals; controlled oscillator means connected to receive said combined output signal as an input for producing an output signal having a frequency which corresponds with the amplitude of the combined signal; controlled motor means of the synchronous motor type connected to receive the output of said oscillator means as an input, the speed of rotation of its output shaft being proportional to the frequency of its input; reference oscillator means adapted to produce a fixed-frequency output signal of high stability; reference motor means of the synchronous motor type connected to receive the output of said reference oscillator means as an input, the speed of rotation of its output shaft being proportional to the frequency of its input; and means coupled to the output shafts of said controlled motor means and said reference motor means for comparing the speed of rotation of the output shaft of said controlled motor means with that of the output shaft of said reference motor means and producing an output rotation the speed of which is the difference between these speeds of rotation, the output rotation of said comparison means being zero when the speed of rotation of said controlled motor means equals the speed of rotation of said reference motor means, this condition being obtained by properly adjusting the amplitude of said zero-set signal in the absence of any signal to be integrated, the speed of the output rotation of the comparison means being proportional to the amplitude of the signal to be integrated so that the total angle of travel of the output rotation is the integral with respect to time of said amplitude of the signal to be integrated.

5. A device for integrating a signal comprising, in combination: connections for at least a pair of input signals, the first connection being for a signal to be integrated and the second being for a zero-set signal; means connected to said two connections for producing a combined output signal which constitutes the sum of the amplitudes of said input signals; controlled oscillator means connected to receive said combined output signal as an input for producing an output signal having a frequency which corresponds with the amplitude of the combined signal; controlled motor means of the synchronous motor type connected to receive the output of said oscillator means as an input, the speed of rotation of its output shaft being proportional to the frequency of its input; reference oscillator means adapted to produce a fixed-frequency output signal of high frequency stability; reference motor means of the synchronous motor type connected to receive the output of said reference oscillator means as an input, the speed of rotation of its output shaft being proportional to the frequency of its input; and mechanical differential means for comparing the speed of rotation of the output shaft of said controlled motor means with that of said reference motor means, said mechanical differential means having two input gears and an output gear, one input gear being rotated by the output shaft of said controlled motor means and the other input gear being rotated by the output shaft of said reference motor means, the speed of rotation of the output gear being the difference between the speeds of rotation of said input gears, said zero-set signal being adjusted initially, in the absence of any signal to be integrated, to set the frequency of said controlled oscillator means so that the speed of rotation of said controlled-motor-means input gear equals that of said reference-motor-means input gear, whereby, when said signal to be integrated is present, said output gear rotates at a speed proportional to the amplitude of said signal to be integrated, the total angle through which said output gear travels being the integral with respect to time of the amplitude of said signal to be integrated.

6. A device for integrating a signal comprising, in combination: connections for at least a pair of input signals, the first connection being for a signal to be integrated and the second being for a zero-set signal; means connected to said two connections for producing a combined output signal which constitutes the sum of the amplitudes of said input signals; controlled oscillator means connected to receive said combined output signal as an input for producing an output signal having a frequency which corresponds with the amplitude of the combined signal; controlled motor means of the synchronous motor type connected to receive the output of said oscillator means as an input, the speed of rotation of its output shaft being proportional to the frequency of its input; reference oscillator means of the tuning-fork-oscillator type producing a fixed-frequency output signal of high frequency stability; reference motor means of the synchronous motor type connected to receive the output of said reference oscillator means as an input, the speed of rotation of its output shaft being proportional to the frequency of its input; and mechanical differential means for comparing the speed of rotation of the output shaft of said controlled motor means with that of said reference motor means, said mechanical differential means having two input gears and an output gear, one input gear being rotated by the output shaft of said controlled motor means and the other input gear being rotated by the output shaft of said reference motor means, the speed of rotation of the output gear being the difference between the speeds of rotation of said input gears, said zero-set signal being adjusted initially, in the absence of any signal to be integrated, to set the frequency of said controlled oscillator means so that the speed of rotation of said controlled-motor-means input gear equals that of said reference-motor-means input gear, whereby, when said signal to be integrated is present, said output gear rotates at a speed proportional to the amplitude of said signal to be integrated, the total angle through which said output gear travels being the integral with respect to time of the amplitude of said signal to be integrated.

7. A device for integrating a signal comprising, in combination: connections for at least a pair of input signals, the first connection being for a signal to be integrated and the second being for a zero-set signal; means connected to said two connections for producing a combined output signal which constitutes the sum of the amplitudes of said input signals; controlled oscillator means connected to receive said combined output signal as an input for producing an output signal having a frequency which corresponds to the amplitude of the combined signal; feedback means connected to receive the output signal of said controlled oscillator means as an input signal and to feed back a portion of this output signal to the input of said controlled oscillator means as a negative feedback signal; controlled motor means of the synchronous motor type connected to receive the output of said oscillator means as an input, the speed of rotation of its output shaft being proportional to the frequency of its input signal; reference oscillator means adapted to produce a fixed-frequency output signal of high frequency stability; reference motor means of the synchronous motor type connected to receive the output of said reference oscillator means as an input, the speed of rotation of its output shaft being proportional to the frequency of its input; and mechanical differential means for comparing the speed of rotation of the output shaft of said controlled motor means with that of said reference motor means, said mechanical differential means having two input gears and an output gear, one input gear being rotated by the output shaft of said controlled motor means and the other input gear being rotated by the output shaft of said reference motor means, the speed of rotation of the output gear being the difference between the speeds of rotation of said input gears, said zero-set signal being adjusted initially, in the absence of any signal to be integrated, to set the frequency of said controlled oscillator means so that the speed of rotation of said controlled-motor-means input gear equals that of said reference-motor-means input gear whereby, when said signal to be integrated is present, said output gear rotates at a speed proportional to the amplitude of said signal to be integrated, the total angle through which said output gear rotates being the integral with respect to time of the amplitude of said signal to be integrated.

8. A device for integrating a signal comprising, in combination: connections for three input signals, the first connection being for a signal to be integrated and the second being for a zero-set signal; means connected to said three connections for producing a combined output signal; means for amplifying the combined output signal of said combining means; controlled oscillator means connected to said amplifier means and producing an output signal having a frequency which corresponds with a characteristic of the amplified combined signal; feedback means connected between the output of said controlled oscillator means and the third input signal connection, said feedback means utilizing the output signal from said oscillator means to feed back to said third input signal connection an input signal which will provide negative feedback to stabilize the frequency of the output of said oscillator means; controlled motor means of the synchronous motor type connected to receive the output of said oscillator means as an input, the speed of rotation of its output shaft being proportional to the frequency of its input signal; reference oscillator means adapted to produce a fixed-frequency output signal of high frequency stability; reference motor means of the synchronous motor type connected to receive the output of said reference oscillator means as an input, the speed of rotation of its output shaft being proportional to the frequency of its input signal; and means coupled to the output shafts of said controlled motor means and said reference motor means for comparing the speed of rotation of the output shaft of said controlled motor means with that of the output shaft of said reference motor means and producing an output rotation the speed of which is the difference between these speeds of rotation, the output rotation of said comparison means being zero when the speed of rotation of said controlled motor means equals the speed of rotation of said reference motor means, this condition being obtained by properly adjusting a characteristic of said zero-set signal in the absence of any signal to be integrated, the speed of the output rotation of the comparison means being proportional to a characteristic of the signal to be integrated so that the total angle of travel of the output rotation is the integral with respect to time of said characteristic of the signal to be integrated.

9. A device for integrating a signal comprising, in combination: connections for three input signals, the first connection being for a signal to be integrated and the second being for a zero-set signal; means connected to said three connections for producing a combined output signal which constitutes the algebraic sum of said three input signals; means for amplifying the combined output signal of said summing means; controlled oscillator means connected to said amplifier means and producing an output signal having a frequency which corresponds with the amplitude of the amplified combined signal; feedback means connected between the output of said controlled oscillator means and the third input signal connection, said feedback means utilizing the output signal from said oscillator means to feed back to said third input signal connection an input signal which will provide negative feedback to stabilize the frequency of the output of said oscillator means; controlled motor means of the synchronous motor type connected to receive the output of said oscillator means as an input, the speed of rotation of its output shaft being proportional to the frequency of its input signal; differential means having two input gears and an output gear, one said input gear being rotated by the output shaft of said controlled motor means, and the speed of rotation of its output gear being determined by the difference between the speeds of rotation of its two input gears; reference oscillator means adapted to produce a fixed-frequency output signal of high frequency stability; and reference motor means of the synchronous motor type connected to receive the output of said reference oscillator means as an input, the speed of rotation of its output shaft being proportional to the frequency of its input signal and its output shaft being coupled to rotate the other input gear of said differential means, the output gear of said differential means ceasing to rotate when the speed of the gear driven by the controlled motor means is equal to the speed of the input gear driven by the reference motor means, this condition being initially obtained by removing the signal to be integrated and adjusting the amplitude of said zero-set input signal until the frequency of the controlled oscillator means is such that the speed of the input gear driven by the controlled motor means is the same as the speed of the input gear driven by the reference motor means, the total angle through which said output gear travels after this zero setting has been accomplished being the integral with respect to time of the amplitude of said signal to be integrated since the speed of rotation of said output gear is proportional to the amplitude of the signal to be integrated only.

10. A device for integrating a signal comprising, in combination: connections for two input signals, the first connection being for a signal to be integrated and the second being for a zero-set signal; a summing network connected to said two connections for producing a combined output signal which constitutes the sum of the amplitudes of said input signals; controlled oscillator means comprising a free-running multivibrator connected to receive said combined output signal as an input for producing an output signal having a frequency which corresponds to the amplitude of the combined signal; feedback means comprising a one-shot multivibrator connected to receive the output signal of said free-running multivibrator as an input signal and to feed back its own output signal to the input of said free-running multivibrator as a negative feedback signal; controlled motor means of the synchronous motor type connected to receive the output of said oscillator means as an input, the speed of rotation of its output shaft being proportional to the frequency of its input signal; reference oscillator means of the tuning-fork oscillator type producing a fixed-frequency output signal of high frequency stability; reference motor means of the synchronous motor type connected to receive the output of said reference oscillator means as an input, the speed of rotation of its output shaft being proportional to the frequency of its input; and mechanical differential means for comparing the speed of rotation of the output shaft of said controlled motor means with that of said reference motor means, said mechanical differential means having two input gears and an output gear, one input gear being rotated by the output shaft of said controlled motor means and the other input gear being rotated by the output shaft of said reference motor means, the speed of rotation of the output gear being the difference between the speeds of rotation of said input gears, said zero-set signal being adjusted initially, in the absence of any signal to be integrated, to set the frequency of said controlled oscillator means so that the speed of rotation of said controlled-motor-means input gear equals that of said reference-motor-means input gear whereby, when said signal to be integrated is present, said output gear rotates at a speed proportional to the amplitude of said signal to be integrated, the total angle through which said output gear rotates being the integral with respect to time of the amplitude of said signal to be integrated.

References Cited in the file of this patent

UNITED STATES PATENTS 2,733,391  Mayer _____ Jan. 31, 1956